United States Patent
Castaigne

[11] 3,717,649
[45] Feb. 20, 1973

[54] 2-DIETHYLAMINO-ETHYL NICOTINATE, PARA-CHLORO-PHENOXY-ISOBUTYRIC ACID SALT

[75] Inventor: Albert R. J. Castaigne, Toulouse, France

[73] Assignee: Centre D'Etudes Pour L'Industrie Pharmaceutique, Toulouse, France

[22] Filed: Jan. 11, 1971

[21] Appl. No.: 105,625

[30] Foreign Application Priority Data

Jan. 20, 1970 France..................................7001876

[52] U.S. Cl..............................260/295.5 R, 424/266
[51] Int. Cl..............................................C07d 31/36
[58] Field of Search..............................260/295.5 R

[56] References Cited
UNITED STATES PATENTS 3,622,587   11/1971   Carlson et al...................260/295.5 R

*Primary Examiner*—Alan L. Rotman
*Attorney*—Young & Thompson

[57] ABSTRACT

This invention relates to 2-diethylamino-ethyl nicotinate, para-chloro-phenoxy-isobutyric acid salt, having the formula:

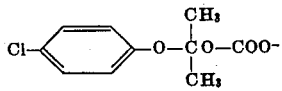

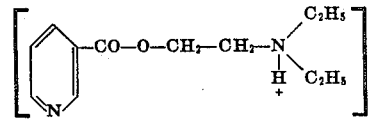

which possesses in particular useful pharmacological properties, particularly blood-lipids normalizing and blood-cholesterol reducing properties which make it therapeutically valuable to reduce the concentration of cholesterol and other lipids in blood serum.

1 Claim, No Drawings

2-DIETHYLAMINO-ETHYL NICOTINATE, PARA-CHLORO-PHENOXY-ISOBUTYRIC ACID SALT

This invention relates to a new nicotinic acid derivative.

The new derivative of the invention, 2-diethylamino-ethyl nicotinate, para-chloro-phenoxy-isobutyric acid salt, has the formula:

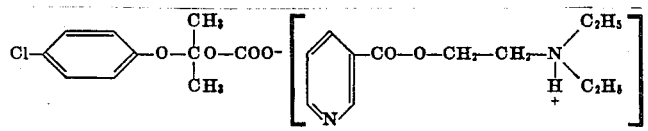

It possesses useful pharmacological properties, particularly blood-lipids normalizing and blood-cholesterol reducing properties, which make it therapeutically valuable to reduce the concentration of cholesterol and other lipids in blood serum.

The new compound of formula (I) is produced by reacting para-chloro-phenoxy-isobutyric acid with 2-diethylamino-ethyl nicotinate.

The latter compound may in turn be obtained by reaction of quinolinic anhydride with diethyl-amino-ethanol, followed by a decarboxylation by heating the resulting diethyl-amino-ethanol monoquinolinate in vacuo, at a temperature within the range from 120° to 130° C.

The following non limiting example is given to illustrate the process according to the invention.

EXAMPLE 1

Para-chloro-phenoxy-isobutyric acid (214.5 g) dissolved in absolute ethanol (200 ml) is added to a 1,500 ml Erlenmeyer, and 2-diethyl-amino-ethyl nicotinate (208 g) is then added thereto.

The solution is slightly heated to initiate the reaction. When the ethanolic medium becomes clear, the reaction is completed.

The ethanol is evaporated in vacuo, to give a residue consisting of 2-diethyl-amino-ethyl nicotinate, para-chloro-phenoxy-isobutyric acid salt.

This derivative is in the form of a more or less brown liquid, having an ethyl acetate odor. It is soluble in water, alcohol, ether, chloroform. Inspection of its absorption spectrum under U.V. light shows that maximum absorption occurs at a wavelength of 262 nm.

It may be assayed either by nitrogen titration of the basic portion of the molecule by means of perchloric acid in the presence of α-naphthol-benzene as indicator, or by titration of the acidic function by means of tetrabutylammonium hydroxide, in the presence of bromthymol blue.

The invention relates also to a therapeutic composition having in particular a blood-lipid normalizing and blood-cholesterol reducing activity, comprising 2-diethylamino-ethyl nicotinate, para-chloro-phenoxy-isobutyric acid salt, together with a pharmaceutically acceptable vehicle.

Data resulting from toxicological and pharmacological tests carried out with the new derivative of the invention are given below for illustrative purposes. 1. The toxicological investigation related to acute toxicity, chronic toxicity, sub-chronic toxicity, delayed toxicity, local and systemic tolerance and teratogenic effects.

Acute toxicity is low. For example, $LD_{50}$/72 hrs, determined according to the method of Miller and Tainter, is 2,000 mg/kg in Swiss mice and 4,300 mg/kg in Wistar rats, after a single administration of the active material by gastric intubation.

As to chronic toxicity, administration of 1,200 mg/kg by gastric intubation during 3 months in Wistar rats produced no digestive, hepatic or renal functional disorder, and no change in behavior.

With respect to subchronic toxicity, the tests carried out in rats and dogs showed the low toxicity and the good tolerance of the derivative of this invention. Indeed, throughout such tests, evidence of toxic effects appeared only at high dosages, far higher than the therapeutic dosages.

The derivative is free from teratogenic effects.

2. The pharmacological investigation demonstrated the blood-lipids normalizing and blood-cholesterol reducing effects of 2-diethyl-amino-ethyl nicotinate, para-chloro-phenoxy-isobutyric acid salt.

Experimentation was carried out on a total of 300 rats given dosages varying from 20 to 200 mg/kg of the derivative of this invention, by gastric intubation, said dosages being administered in one or two doses over a period of time of 15 days (treated lots). These animals were fed various hypercholesterolemic, hyperlipidic and hyperglycidic diets. Control determinations carried out both during experimentation (biological determinations) and after sacrificing the animals (macroscopic and microscopic examination of various organs) made it possible to find that all the disorders produced in the reference animals, such as aortic and pulmonary atheroma, hepatic steatosis, hepatic and cardiac necroses (due to substantial thrombogenesis) hypercholesterolemia, hyperlipemia, variation of the electrophoretic ratios, were substantially decreased in the animals of the treated lots, with respect to the animals of the reference lots.

The mean protection percentages were 45 percent in the lots treated with 20 mg/kg, 67 percent in the lots treated with 160 mg/kg and 89 percent in the lots treated with 200 mg/kg, respectively.

No modification of the intestinal transit occurred throughout such experiments. Moreover, no sign of intolerance at the level of the mucous membranes of the digestive tract could be noted.

Thus, it is apparent that the derivative of this invention controls effectively the metabolism of cholesterol and blood lipids. It has an excellent protective action against experimental atheroma and consequent involvments, and has the added benefit of an interesting therapeutical margin.

The composition of this invention is advantageously formulated in unit dosage form for oral administration, such as capsules and drinkable ampoules, or for parenteral administration, such as injectable ampoules.

Each unit dose may contain, for example, 50—500 mg of active ingredient together with the usual vehicles and excipients suitable for the galenic form selected.

In view of the low toxicity of the derivative of this invention and of its good tolerance, the daily dosage regimen may vary within a broad range from 0,100 to 2,000 g, depending on the route of administration used and of the seriousness of the condition to be treated.

The following non limiting examples are given to illustrate pharmaceutical formulations containing the composition of this invention.

EXAMPLE 2

Capsules
2-Diethyl-amino-ethyl nicotinate,
para-chloro-phenoxy-isobutyric acid salt  0,250 g
Excipient, q.s. to make  1 capsule.

EXAMPLE 3

Drinkable solution (ampoules) 2-Diethyl-
amino-ethyl nicotinate,
para-chloro-phenoxy-isobutyric acid salt  0.350 g
Flavored excipient q.s. to make  5 ml.

EXAMPLE 4

Injectable solution
2-Diethyl-amino-ethyl nicotinate,
para-chloro-phenoxy isobutyric acid salt  0.300 g
Normal saline solution  3 ml.

The data resulting from clinical records of patients treated with the composition of this invention will be given below.

CLINICAL INVESTIGATION

Due to its blood-cholesterol reducing and blood-lipids normalizing properties, and since it inhibits the release of fatty acids and has a decreasing effect on triglycerides synthesis, the composition of this invention may be used in medicine to combat efficiently atheroma and dyslipemia.

For all patients treated, a biological balance sheet was established both prior to and after treatment, said balance sheet relating to total lipid level, total cholesterol level, triglycerides level, and phospholipids level, and also to the measurements of Burstein-dextran and Kunkel-phenol flocculation tests.

Such determinations demonstrate the variations of the blood-lipids level, the increase of which characterizes the biological syndrome of dyslipemia.

CASE REPORT No. 1

Mr Albert D. . . , aged 58, suffers from plethoric diabetes recognized 16 years ago, and treated with blood-sugar reducing sulfa-drugs. Is admitted to the hospital for left ventricular insufficiency.

On clinical examination, blood pressure is 19–11, the heart is regular, however, under the screen, it exhibits cardiomegaly with cardiac lung. The ECG discloses a bilateral incomplete branch block. A diabetic retinopathy appears on examination of the fundus oculi.

The patient is prescribed 3 capsules of Example 2 daily, during 45 days.

| Nature of the tests | Before treatment | After treatment |
| --- | --- | --- |
| Total lipids | 12.80 g/l | 7.90 g/l |
| Total cholesterol | 2.70 g/l | 2.0 g/l |
| Triglycerides | 1.75 g/l | 1.15 g/l |
| Phospholipids | 3.25 g/l | 1.80 g/l |
| Burstein | 186 V.U. | 63 V.U. |
| Kunkel | 119 V.U. | 68 V.U. |

Excellent results and tolerance.

CASE REPORT NO. 2

Mr Daniel B. . . , aged 47, suffers from chronic cholecystitis and consults because of headaches and dizziness.

Laboratory tests show a marked increase of the lipids level. He is prescribed a treatment with the drinkable ampoules of Example 3, at a daily rate of 3, during 1 month.

On completion of the treatment, the subjective symptoms have disappeared and the balance sheet shows there is marked decrease of the abnormally high blood levels, as set forth in the following table.

| Nature of the tests | Before treatment | After treatment |
| --- | --- | --- |
| Total lipids | 9.90 g/l | 7.10 g/l |
| Total cholesterol | 3.60 g/l | 2.45 g/l |
| Triglycerides | 1.30 gl | 0.55 g/l |
| Phospholipids | 3.80 g/l | 3.40 g/l |
| Burstein | 77 V.U. | 42 V.U. |
| Kunkel | 69 V.U. | 37 V.U. |

Excellent results and tolerance.

CASE REPORT NO. 3

Mrs Leonie S. . . , aged 68, suffers from hypercholesterolemia already treated on various occasions, without much success, with various blood-cholesterol reducing compounds.

She consults because of severe fatigue accompanied with headaches and dizziness.

She is prescribed a 2 month treatment with the composition of example 2, at a rate of 2 capsules daily.

On completion of the treatment, clinical improvement is satisfactory and is confirmed by the following biological data:

| Nature of the tests | Before treatment | After treatment |
| --- | --- | --- |
| Total lipids | 11.60 g/l | 8.1 g/l |
| Total cholesterol | 3.40 g/l | 2.3 g/l |
| Triglycerides | 1.75 g/l | 1.00 g/l |
| Phospholipids | 3.20 g/l | 1.80 g/l |
| Burstein | 77 V.U. | 39 V.U. |
| Kunkel | 71 V.U. | 42 V.U. |

Excellent results and tolerance.

CASE REPORT NO. 4

Mr Jean I. . . , aged 49, suffers from hypercholesterolemia discovered on systematic examination.

No clinical sign is noted on examination.

He is prescribed a treatment with the injectable ampoules of example 4, at a rate of 3 injections per week, during 60 days. On completion of the treatment, the balance sheet is established and shows a marked improvement of the biological signs.

| Nature of the tests | Before treatment | After treatment |
| --- | --- | --- |
| Total lipids | 13.1 g/l | 8.80 g/l |
| Total cholesterol | 3.10 g/l | 2.70 g/l |
| Triglycerides | 1.90 g/l | 1.20 g/l |
| Phospholipids | 3.40 g/l | 3.00 g/l |
| Burstein | 78 V.U. | 43 V.U. |
| Kunkel | 49 V.U. | 43 V.U. |

Excellent result and tolerance.

CASE REPORT NO. 5

Mr Charles R. . . , aged 44, consults because of asthenia and frequent spells of dizziness. Laboratory tests show very substantial dyslipemia.

He is prescribed a treatment with the composition of Example 3, at a daily rate of 4 drinkable ampoules.

After one month of treatment, there is substantial decrease of the asthenia and the dizziness has disappeared. The biological balance sheet established on completion of the treatment discloses satisfactory results with respect to the lipids content.

| Nature of the tests | Before treatment | After treatment |
|---|---|---|
| Total lipids | 19.8 g/l | 9.9 g/l |
| Total cholesterol | 6.0 g/l | 3.1 g/l |
| Triglycerides | 5.4 g/l | 1.7 g/l |
| Phospholipids | 4.3 g/l | 2.5 g/l |
| Burstein | 188 V.U. | 73 V.U. |
| Kunkel | 156 V.U. | 70 V.U. |

Excellent results and tolerance.

CASE REPORT NO. 6

Mr Gregoire T. . . , aged 67, suffers from arterial hypertension known since 11 years ago. He complains from a number of functional disorders, of headache and floating black spots type. On clinical examination, blood pressure is high (26–14), the left ventricle is enlarged, and the fundus oculi is at stage 2.

Laboratory control tests disclose high blood-lipid levels. He is prescribed 3 capsules of Example 2 daily, during 2 months. On completion of the treatment, the patient finds there is a marked decrease of the headaches and black spots, while biological control tests demonstrate a marked therapeutic effect.

| Nature of the tests | Before treatment | After treatment |
|---|---|---|
| Total lipids | 9.40 g/l | 6.7 g/l |
| Total cholesterol | 3.50 g/l | 2.0 g/l |
| Triglycerides | 1.65 g/l | 1.10 g/l |
| Phospholipids | 2.90 g/l | 2.30 g/l |
| Burstein | 68 V.U. | 33 V.U. |
| Kunkel | 62 V.U. | 36 V.U. |

Excellent results and tolerance.

The results obtained from the present clinical investigation show that the composition of this invention benefits from excellent clinical and biological tolerance. While substantially free from side-effects it normalizes the metabolism of the lipid and, thereby, exerts a potent preventive action against atheroma and thrombosis.

It produces an improvement of the clinical signs of atherosclerosis and an improvement of functional signs such as headaches and asthenia. It acts concomitantly on the cholesterol and lipids contents, by substantially decreasing same, and also on the other biological criteria characteristic of dyslipemia.

It may be usefully employed in the preventive and curative treatment of all atheromatous conditions, whether or not associated with clinical manifestations of vascular deficiency, of hyperlipidemia, of hypercholesterolemia and of dyslipemia.

Having now described my invention what I claim and desire to secure by Letters Patent is:

1. 2-diethylamino-ethyl nicotinate, para-chlorophenoxy-isobutyric acid salt, of the formula

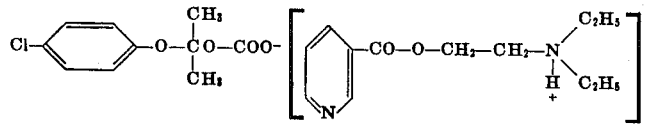

* * * * *